Feb. 23, 1932.                F. H. BOGART                1,846,986
                    COUPLING BORING AND THREADING MACHINE
                    Filed Feb. 2, 1927    4 Sheets-Sheet 1
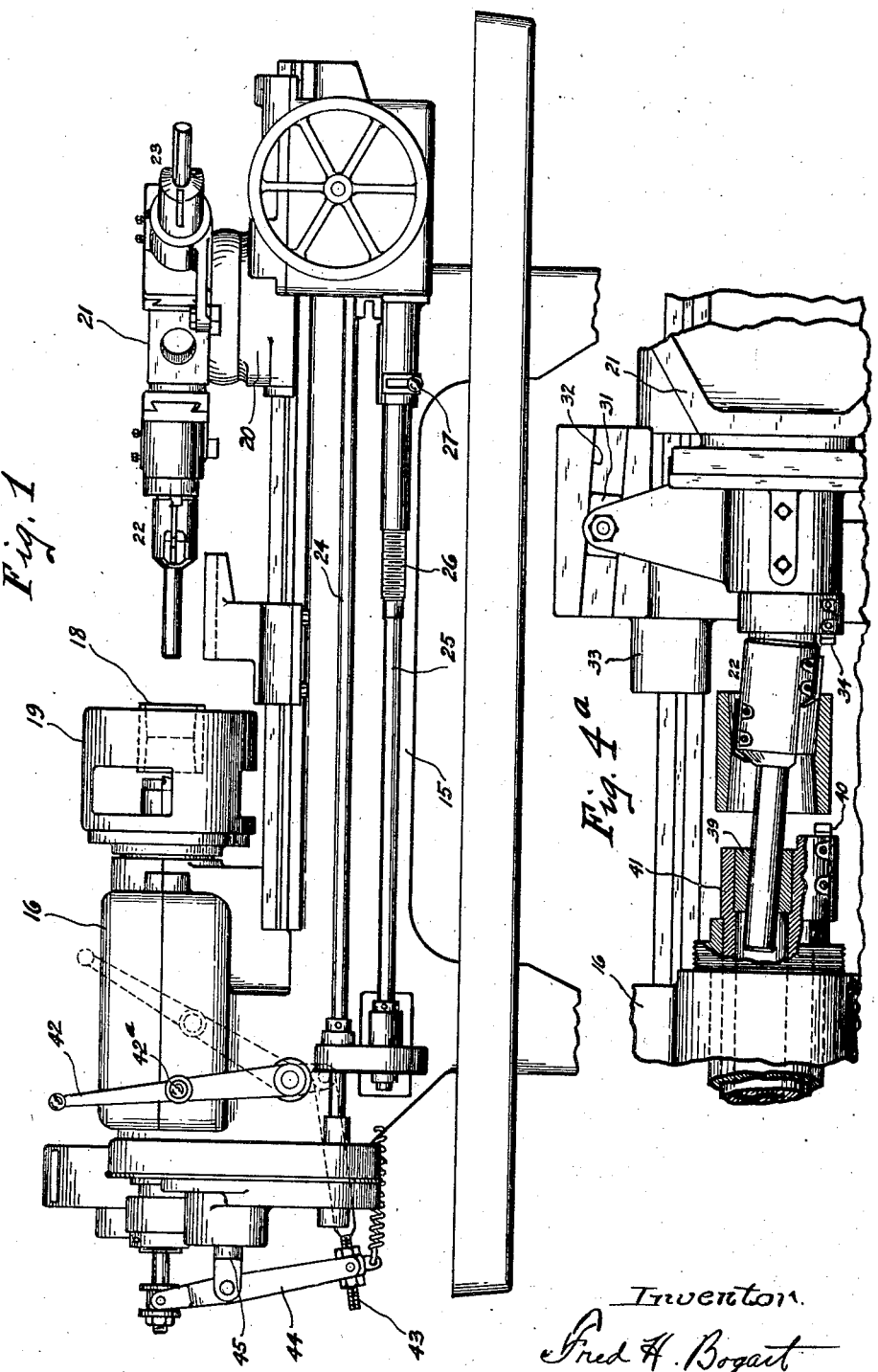

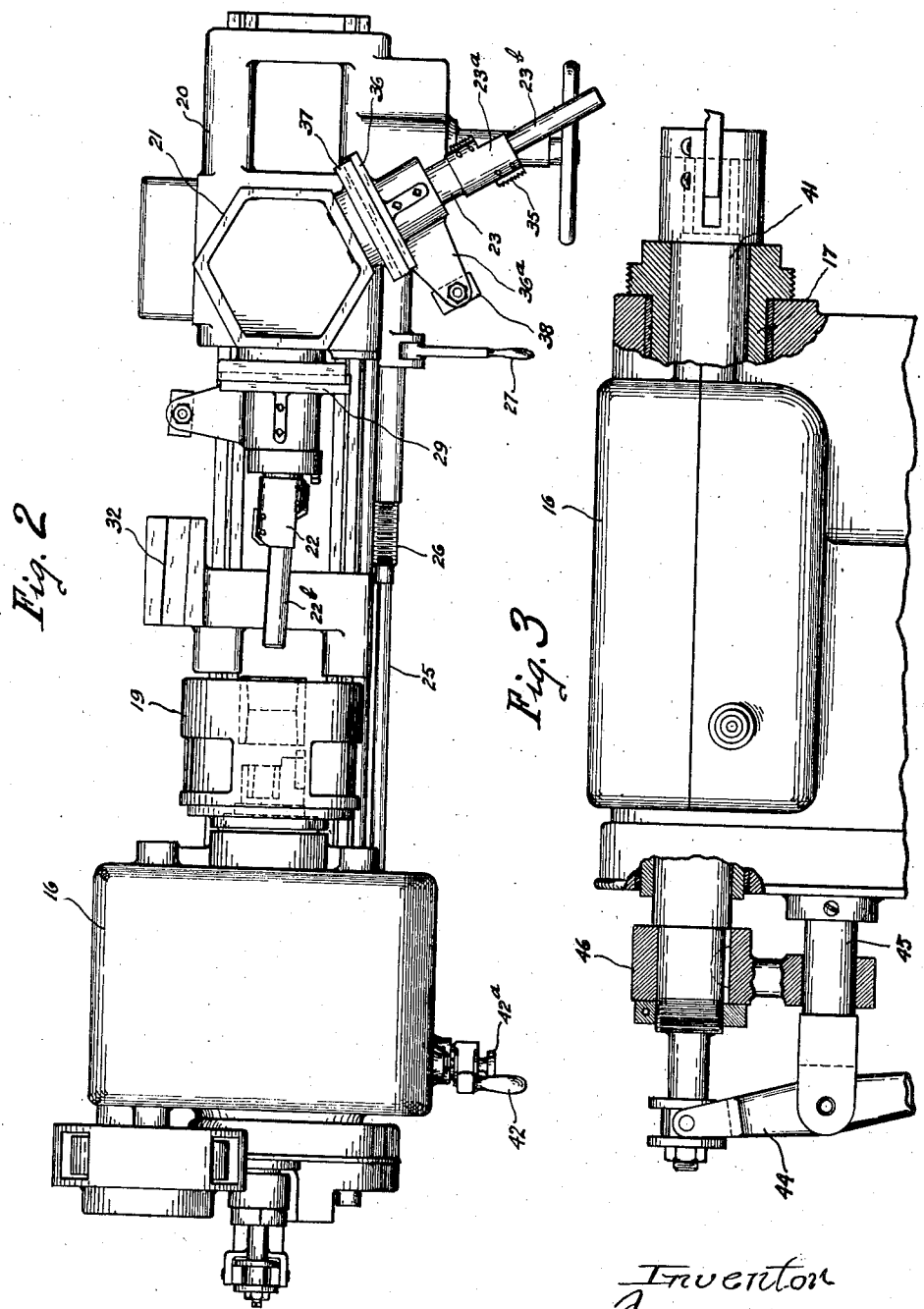

Feb. 23, 1932. F. H. BOGART 1,846,986
COUPLING BORING AND THREADING MACHINE
Filed Feb. 2, 1927 4 Sheets-Sheet 3
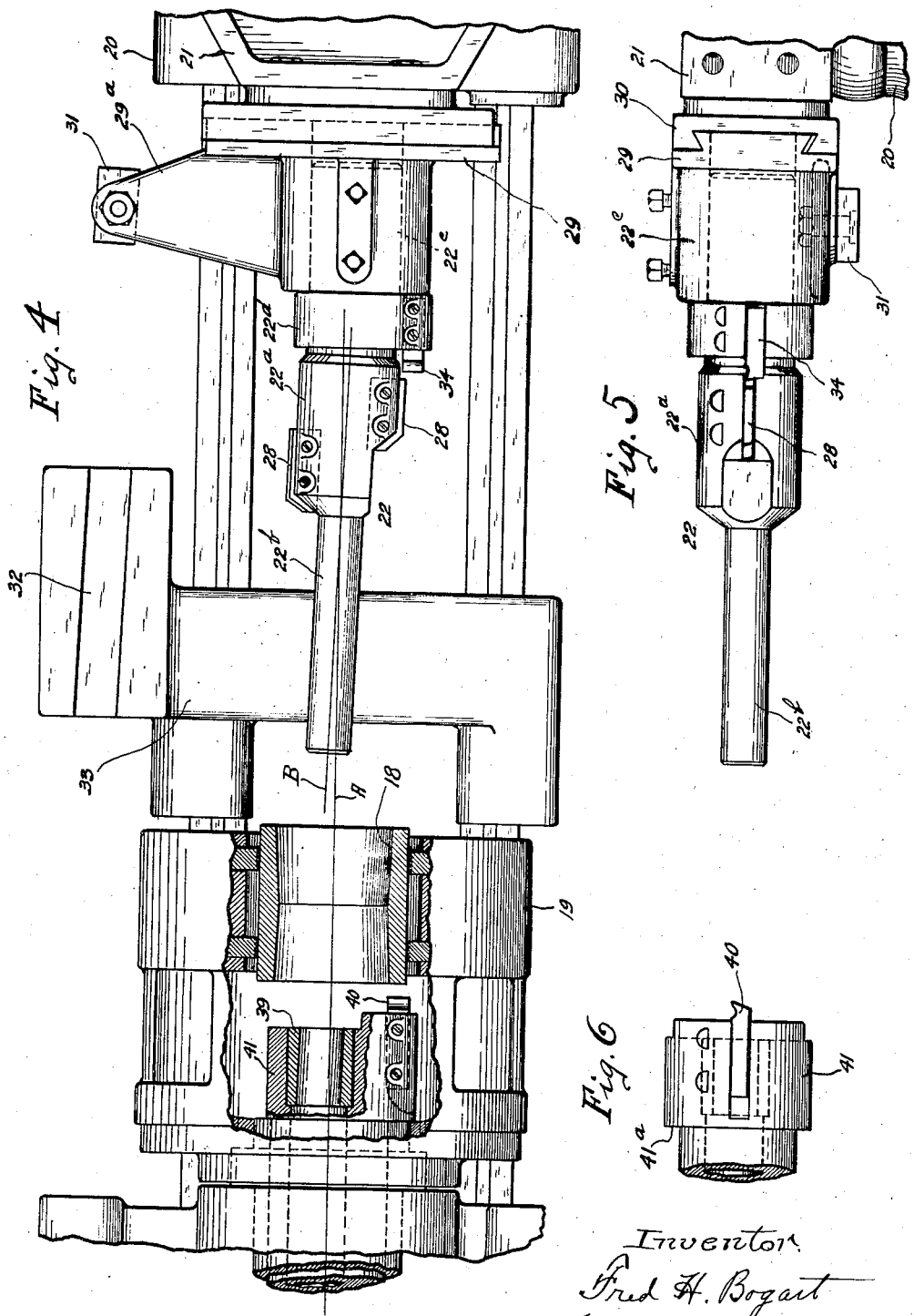

Feb. 23, 1932.  F. H. BOGART  1,846,986
COUPLING BORING AND THREADING MACHINE
Filed Feb. 2, 1927  4 Sheets-Sheet 4
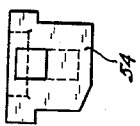
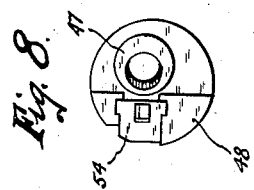
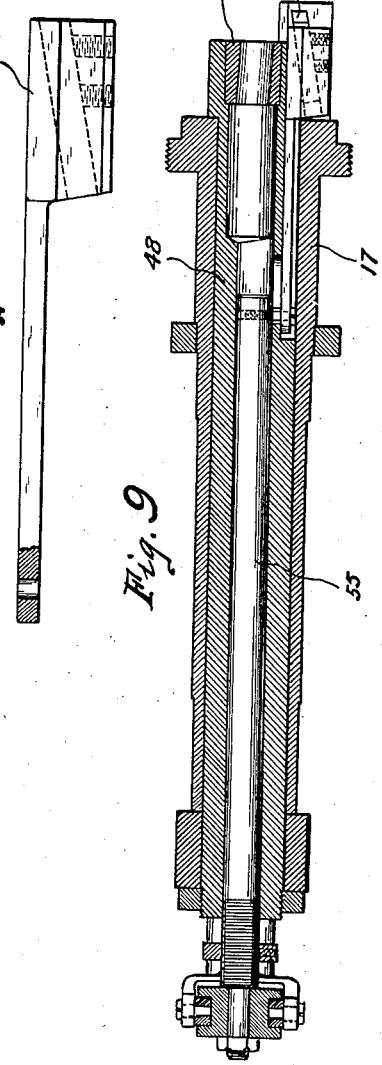
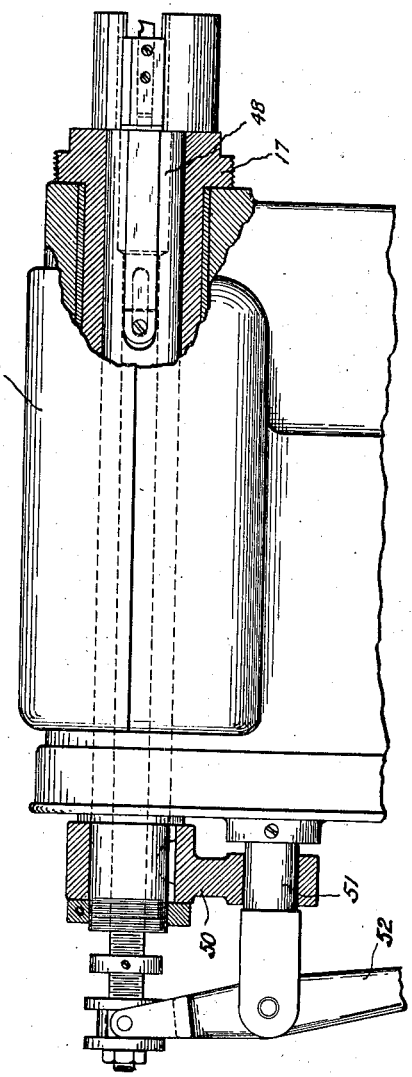
Inventor
Fred. H. Bogart
Kwis Hudson + Kent
Attys Patented Feb. 23, 1932

1,846,986

UNITED STATES PATENT OFFICE

FRED H. BOGART, OF CLEVELAND, OHIO, ASSIGNOR TO THE WARNER & SWASEY COMPANY, OF CLEVELAND, OHIO, A CORPORATION OF OHIO

COUPLING BORING AND THREADING MACHINE

Application filed February 2, 1927. Serial No. 165,264.

This invention relates to coupling boring and threading apparatus for machines and has particular reference to an attachment adapted to be applied to standard machines such as turret lathes, boring mills, and the like.

One of the objects of the present invention is to provide an improved coupling boring and threading mechanism, preferably in the form of an attachment for standard machines by which both halves of the coupling are bored and then threaded and the ends faced during one setup of the machine.

A further object is to accomplish the boring and threading operations with the work carried by the rotating work spindle of the machine and with the axis of the work coinciding with the axis of the machine while the boring or threading tools are given a movement, while boring or threading, in a direction angularly disposed with reference to the axis of the machine.

A further object of the invention is to provide a boring and threading mechanism by which couplings of widely varying diameters may be readily bored and threaded.

A still further object is to produce accurate threading using standard thread chasing equipment commonly employed with machine tools such as turret lathes.

The above and other objects are attained by the present invention which may be briefly summarized as consisting in certain novel details of construction and combinations and arrangements of parts which will be described in the specification and set forth in the appended claims.

In the accompanying sheets of drawings in which I have shown my invention applied to a machine tool in the form of a turret lathe, Fig. 1 is a side elevation of the lathe with my improved attachment applied thereto; Fig. 2 is a top plan view of the same; Fig. 3 is a view partly in side elevation and partly in section showing the head of the lathe omitting the work holding chuck; Fig. 4 is an enlarged plan view of a portion of Fig. 2 with certain parts in section; Fig. 4a is a view of a portion of Fig. 4 on a reduced scale showing the parts at the start of the boring operation; Fig. 5 is a side view of the boring tool holder; Fig. 6 is a side view of the back facing tool holder; Fig. 7 is a view similar to Fig. 3 showing a modification; Fig. 8 is an end view of the back facing tool holder and pilot bushing support of Fig. 7; Fig. 9 is a horizontal sectional view through the spindle of Fig. 7; Fig. 10 is a detached view of the slide for the back facing tool holder of Figs. 7, 8 and 9; and Fig. 11 is an end view of the same.

Referring now to the drawings, 15 is the bed of what may be termed a standard turret lathe, having a head 16 supporting a work holding spindle 17 which can be rotated by the usual means contained in the head 16. The spindle 17 is adapted to support and rotate the work which in this instance consists of a coupling 18, and for that purpose it is provided with a suitable chuck 19 which will be provided with work gripping jaws such as indicated in Fig. 4. A point to be noted is that the coupling 18, when in the chuck, is supported and rotated with the axis of the coupling coinciding with the axis of the machine.

The lathe bed 15 has the usual ways along which is adapted to travel a turret slide 20 carrying a turret 21 which may be of standard construction and to two faces of which are adapted to be applied tool holders, one for the boring tools and the other for the threading tools. In the drawings, the tool holder for the boring tools is indicated at 22. This tool holder, as shown in Fig. 2, is supported opposite the coupling in position for boring the two oppositely tapered inner surfaces of the coupling. In this connection, it might be stated that in my machine, as in the most approved coupling boring and threading machines in use at the present time, the two oppositely tapered faces on the interior of the coupling are bored simultaneously and then threaded simultaneously. The tool holder for the threading tools is indicated at 23, this tool holder being adapted to be brought to the position of the tool holder 22 shown in Fig. 2, by indexing the turret 21 through the usual turret indexing means.

The lathe herein illustrated has the usual feed shaft 24 for feeding the turret slide during the boring operation, and it is provided with a shaft 25 with a master threading sleeve 26 adapted to be engaged by a follower controllable by a lever 27 for use in feeding the slide for the threading operation. The master threading sleeve 26 constitutes a part of standard threading equipment which can be used with a tap for cutting ordinary standard pipe threads.

The tool holder 22 is in the form of a boring bar, being provided with a body portion 22a and a pilot portion 22b. The body 22a is provided with a pair of boring tools 28 which are disposed on opposite sides of the bar, one in advance of the other, so that the two tools may simultaneously bore the oppositely tapered portions of the coupling. The cutting tools 28 may be received in slotted portions of the body portion of the bar and may hold in place by screws or other means.

The tool supporting bar 22 is not mounted directly on the turret but it is provided with a rearward extension 22c indicated by dotted lines in Fig. 4, which is received and clamped in the forward portion of a slide 29 which slide is mounted for lateral movement in a bracket 30 which is secured to the face of the turret. The slide 29 has a laterally projecting portion 29a which projects beyond the rear side of the bed and at the free end thereof there is a shoe 31 which, when the turret with the tool carrying parts moves forwardly, is adapted to engage in a cam groove or slot 32 of a cam support 33 which rests upon and is secured to the bed. This cam slot 32 is on a taper which corresponds to the taper of each half of the coupling. It will be noted that the portion of the tool carrying bar projecting beyond the slide is angularly disposed with reference to the axis of the machine and of the coupling 18, the angular displacement being a lateral one and corresponding precisely with the angularity of the cam groove or slot 32. In Fig. 4 the center line of the machine is indicated at A and the center line of the boring bar is indicated at B, this latter line also indicating the direction of movement of the boring bar after the shoe 31 enters the slot 32.

The boring bar 22 is provided between the body portion 22a and the slide 29 with a portion 22d which carries a front end facing tool 34, this tool being adapted to engage the front end of the coupling near the completion of the boring operation.

The threading tool holder 23 is substantially the same as the boring tool holder 22. It comprises a body portion 23a and a pilot portion 23b which when the holder 23 is in operative position for threading are angularly disposed with reference to the axis of the machine like the corresponding portions of the boring tool holder 22. The body portion 23a carries a pair of threading tools 35 which like the boring cutters are disposed on opposite sides of the holder, and one in advance of the other so one may thread one-half of the coupling at the same time that the other threads the other half of the coupling. The holder 23 is secured to a laterally movable slide 36 similar to the slide 29, the slide 36 being carried by a bracket 37 secured to a face of the turret. The slide 36 has a laterally projecting arm 36a with a shoe 38 which is adapted to engage in the cam slot 32 of the cam holder 33 when the threading tool holder is in operative position and the turret slide is moved forwardly to thread the coupling.

It will be observed that when either the boring tools or threading tools are in operation, the tools and the corresponding tool holder are first given a straight or axial movement which moves the pilot portion of the tool holder through the coupling and causes the tools to approach the portions of the inner surface of the coupling which the tools are to bore or thread, but when the shoe 31 or 38, as the case may be, enters the cam slot 32, the tool holder and tools are given combined forward and lateral movements, the resultant of which is a diagonal movement which corresponds with the angularity of the cam slot 32 and of the oppositely tapered faces of the coupling to be bored or threaded. The advantages of the above described construction and of the diagonal movement imparted to the cutting tools in the way of securing accurate results with the use of standard threading equipment for the threading operation will be explained presently.

It is desirable and in fact necessary, to obtain the best results, that the pilot portion of each tool holder 22 and 23 be supported during the boring or threading operation. Accordingly, I provide adjacent the end of the work rotating spindle a pilot support, shown herein as a bushing which the pilot portion of each tool holder is adapted to enter and which supports and guides the pilot portion notwithstanding the angular disposition of the latter and the fact that it is given a resultant diagonal movement. In the construction shown in Figs. 1 to 6 the pilot bushing is designated 39, the bushing being shown in Fig. 4 in position to receive the end of the pilot. In order that the pilot may enter the bushing it is disposed slightly off center and its axis is diagonally disposed in the same direction and the same amount as the diagonal disposition of the pilot and the direction of its movement when the shoe 31 is in engagement with the inclined slot 32. The parts are so disposed that the pilot will enter the bushing after the shoe engages the slot 32 and will move freely therein and be supported thereby during the whole of the boring or threading operation.

Though the pilot bushing is stationary when it receives and functions to support the pilot of either tool holder, nevertheless in the form of the invention illustrated in Figs. 1 to 6, the bushing along with a back facing tool 40 are carried at the forward end of a slidable member 41 which has a bearing in and extends through the work spindle 17 which is hollow as is generally the case in machines of this character, as shown most clearly in Fig. 3. Provision is made for advancing the back facing tool and incidentally the pilot bushing to face off the rear end of the coupling and then to retract the slidable member 41 so that a shoulder 41a becomes solidly seated against the forward end of the spindle before it becomes necessary for the pilot bushing to function.

Any suitable means may be provided for reciprocating this slidable member 41 but, in this instance, this is accomplished by a hand lever 42 (see particularly Figs. 1 and 2) suitably supported by the bed and connected, in this instance, by a link 43 to a lever 44 pivoted on a support 45 at the rear end of the head and having at its upper end a yoke with an operative connection with the slidable member 41. Suitable means is provided for preventing the slidable member 41 turning under the action of the thrust between the coupling and the back facing tool, the means here shown (see Fig. 3) consisting of arm 46 keyed or otherwise secured to the rear portion of the slidable member 41 and having slidable engagement with the support 45 for the lever 44.

The lever 42 is swung forward by hand to the dotted line position shown in Fig. 1 to advance the back facing tool and is then retracted to the full line position so as to position the pilot bushing for engagement by the pilot. Suitable means may be provided to lock the lever 42 in its normal or rearward position, this means consisting of a pull pin 42 which is carried by the lever and is adapted to engage a suitable opening in the head 16.

Instead of supporting the pilot bushing on the slidable member carrying the back facing tool the bushing may be held in fixed position as in the arrangement shown in Figs. 7 to 11. In the arrangement here referred to, the pilot bushing is indicated at 47, this bushing being carried by and fixed in the forward end of a stationary sleeve 48 supported in the work spindle 17. This sleeve though it has no endwise movement, is held from rotative movement by an arm 50 which is keyed to the sleeve, as shown in Fig. 7, and is in suitable thrust resisting relation with a support 51 for lever 52 which actuates the back facing tool, here designated 53. This back facing tool is carried by a tool holding slide 54 which is slidingly supported by the forward end of the stationary sleeve 48 with the tool alongside the pilot bushing 47. This tool holding slide 54 is reciprocated or moved forwardly to cause the back facing tool to face the rear end of the coupling and it is then retracted by an endwise movable rod 55 extending centrally through the stationary sleeve 48 and at its rear end connected to the actuating lever 52 which is adapted to be connected to the hand lever 42 as in the construction first described.

The pilot bushing 47 is mounted off center and the opening therethrough is diagonally disposed in the same manner and to the same extent as the bushing 39 so that it may function to receive and support the pilot of either tool holder 22 or 23 when it is given its diagonal movement previously described. The operation of the machine or of the attachment is as follows:

Assuming that the tool equipment for boring, threading and end facing is on the machine, the operator places a coupling in the work holding chuck and the chuck, and spindle and coupling are then rotated. The operator will generally next swing forward the lever 42 to face the rear end of the coupling, after which the lever is returned to normal position and locked. Then the boring tools are advanced, the first portion of the movement being axially of the machine and when the tools reach the position shown in Fig. 4a, the two cutters begin boring the oppositely tapered portions of the inner surface of the coupling. Just before this occurs, the shoe 31 enters the slot 32 and the pilot portion of the bar enters the pilot bushing. From this point on and in fact until the completion of the boring operation the cutters are given the diagonal movement previously described which, as already stated, coincides with the inclination of the pilot and of the pilot bushing so that the pilot has a free sliding movement in the pilot bushing and is supported thereby. On completion of the boring operation the front end facing tool comes into operation and faces the front end of the coupling.

The movement of the turret slide is then reversed retracting the boring tools and their holder until the pilot is clear of the coupling and chuck; then the turret is indexed so as to bring the threading tools to operative position after which the turret slide is again advanced and at the proper time the operator throws the lever 27 bringing into action the thread chasing equipment and causing both halves of the coupling to be threaded, the movements and the pilot supporting action being precisely the same as during the boring operation.

On the completion of the threading operation the movement of the turret slide is stopped, the rotation of the spindle and chuck is stopped, and the finished coupling is released from the chuck. Then the turret slide is retracted carrying with it the finished coupling and after the retraction of the turret slide, the turret is indexed to again bring the boring tools to operative position. The operation is then repeated, the finished coupling being removed from the threading tool holder during the next boring operation.

The pilot bushing is, of course, stationary and is firmly supported while it is functioning to support the pilot, this condition existing where the pilot bushing is supported on the endwise movable sleeve which carries the back facing tool as in Figs. 1 to 6 and where the pilot bushing is immovably supported as with the construction illustrated in Figs. 7 to 11. It will be understood in the latter case, that in the back facing operation the back facing tool is moved forwardly to face the inner or rear end of the coupling and is then retracted alongside the stationary pilot bushing, the results being the same with either form of this part of my invention. However, the construction illustrated in Figs. 7 to 11 has the advantage that the back facing operation can take place during the boring operation and while the pilot bushing is functioning to support the pilot bar, allowing the two cutting operations to take place at the same time, thus giving greater efficiency in the actual time required for finishing a coupling.

It was heretofore mentioned that accurate threading is accomplished by the use of standard thread chasing equipment. In this connection, it might be stated that in determining the pitch of a standard pipe thread the distance from thread to thread or the pitch is measured axially and not on the taper of the threaded portion which is a greater measurement than the axial measurement. That is to say, the pitch of the thread of the master threading sleeve of the chasing equipment corresponds to the pitch of the pipe thread measured axially but not on the taper.

With my improved machine, in the threading operation the axial movement of the thread cutting tool is at a rate determined by the pitch of the master sleeve of the chasing equipment, this corresponding to the cosine of the angle of the taper. However, at the same time the threading tool is given a lateral movement corresponding to the sine of the angle of obliquity of the cam slot, so that the threading tool actually travels a greater distance than that imparted by the pitch of the master sleeve or a distance which is a resultant of the axial and lateral movements.

It will be seen that if the movement of the threading tool were wholly an axial one and if during the threading operation the coupling were rotated on an axis inclined with respect to the axis of the machine, accurate standard threading would be obtained only by the use of special chasing equipment.

It was heretofore noted that the boring of both halves of the coupling takes place simultaneously, the same being true in the threading of both halves, and it was previously pointed out that the boring, threading and end facing operations are all accomplished by one set up of the machine. This obviously produces more accurate results and is more economical in the time required to finish a coupling than would be the case if the two halves of the coupling were bored and threaded by tools inserted in opposite ends of the coupling, this being true particularly if it were necessary to rechuck the coupling during the course of the finishing operations or after one-half of the coupling was finished.

Inasmuch as both the boring and threading tools are held solidly in their respective tool holders as distinguished from a construction wherein the holder is moved axially during the cutting operation and the cutters moved laterally on the holder to take care of the tapering surface being cut, it is quite feasible and practicable to adjust the cutters in or out or to replace them with cutters of greater width without affecting the efficiency of their support on the holder, and as the result this mechanism is well adapted for boring and threading couplings of quite widely varying diameters. This advantage is not achieved to the same extent in constructions involving the use of cutters slidingly mounted on an axially movable tool holder.

It was pointed out also that it is a feature of the present invention that the coupling boring and threading mechanism is in the form of an attachment for standard machines. In this connection, it might be stated that with my improvements the bed, turret slide, head, tool feeding mechanisms as well as the back facing mechanism including the operating lever, are all standard so that the parts composing the attachment itself can be applied without requiring any modifications or material modifications in a standard machine. This is true irrespective of the type of standard machine for which the attachment is designed, the advantages in this respect being attained whether the attachment is designed for use on a standard lathe or designed for use on some other type of standard machine, such as a boring mill, which may be either a horizontal mill or a vertical mill.

While I have shown the preferred construction and a modification in the manner of supporting the pilot support or bushing and in the arrangement of the pilot portion of the tool holder and for operating the back facing attachment, I do not desire to be confined to the precise mechanisms or arrangements illustrated but aim in my claims to cover all modifications which do not involve a departure from the spirit and scope of my invention in its broadest aspects.

Having thus described my invention, I claim:

1. In a machine of the character described, a rotating work holder, a tool holder disposed diagonally with respect to the axis of the machine, means forwardly of the tools for guiding the tool holder, and means for imparting to the tool holder a combined axial and lateral movement.

2. In a machine of the character described, a rotating work holder, a slide movable toward and from the work holder, a diagonally disposed tool holder, means forwardly of the tools for guiding the tool holder, and means for causing the tool holder to have a lateral movement when the slide is actuated.

3. In a machine of the character described, a rotating work holder, a tool holder having a guide portion and adapted to be given a combined longitudinal and lateral movement with respect to the axis of the machine, and a guide support for guiding the guide portion of the tool holder.

4. In a machine of the character described, a rotating work holder, a slide movable toward and from the work holder, a tool holder supported by the slide for lateral movement and adapted to be moved by the slide in a diagonal direction with respect to the axis of the machine, and a pilot support adapted to receive and support a portion of the tool holder.

5. In a machine of the character described, a work holder and a tool holder, one rotatable with respect to the other, means for causing the work holder and the tool holder to have a relative motion both axially and laterally of the machine, and a pilot support for receiving and supporting a portion of the tool holder.

6. In a machine of the character described, a rotating work holder, a tool holder diagonally disposed with reference thereto and provided with a pilot portion, means for moving one of said parts axially and laterally with respect to the other, and a pilot support adapted to receive the pilot portion of the tool holder during the cutting operation.

7. In a machine of the character described, a work holder, a diagonally disposed tool holder having a pilot portion, a diagonally disposed pilot support adapted to receive a portion of the tool holder, and means for imparting a combined axial lateral relative motion between the work holder and tool holder.

8. In a machine of the character described, a work holder, a pilot support disposed off center and diagonally with respect to the work holder, a diagonally disposed tool holder having a portion to be received in the pilot support, and means for imparting a relative combined axial and lateral motion between the work holder and tool holder.

9. In a coupling boring and threading machine, a head having a rotating work holder, a slide having a turret provided with two tool holders each having a pair of cutting tools and each adapted to be brought into operative position by rotation of the turret, means for causing each tool holder to have a combined axial and lateral motion as it approaches the work holder, and a pilot support in the head adapted to receive a portion of each tool holder.

10. In a machine for boring and threading couplings, a head having a rotating work holder and a pilot support, a slide carrying a turret which is provided with two tool holders each having a pair of cutting tools and each having a pilot portion adapted to be received in the support, and means for imparting a lateral movement to each tool holder as it is moved toward the work holder.

11. In a machine for boring and threading couplings, a head having a rotating work holder, a slide provided with a turret having two tool holders adapted to be provided respectively with cutting and threading tools, means forwardly of the tools for guiding the tool holders, each tool holder being so mounted on the turret that when in operative position it is disposed diagonally with respect to the axis of the machine and has a movement laterally of the axis of the machine during the axial movement of the slide.

12. In a machine for boring and threading couplings, a head provided with a rotating work holder, a slide having a turret carrying two tool holders adapted to be provided respectively with cutting and threading tools, each tool holder having a mounting on the turret which permits the tool holder to move laterally of the axis of the machine, and a pilot support in the head and adapted to receive a portion of each tool holder while it is moved toward and laterally of the work holder.

13. In a machine tool, a rotating work holder, a slide having a tool holder adapted to be provided with a pair of tools for simultaneously cutting oppositely tapered portions of the work, means forwardly of the tools for guiding the tool holder, said tool holder being arranged diagonally with respect to the axis of the machine, and a cam for causing the tool holder to have a lateral movement as well as an axial movement during the cutting operation.

14. In a machine tool, a bed having a rotating work holder, a slide movable toward and from the work holder, a second slide carried by the first named slide and having a holder adapted to be provided with a pair of tools for simultaneously cutting oppositely tapered portions of the work, means forwardly of the tools for guiding the tool holder, said tool holder being diagonally arranged with respect to the axis of the machine, and means for imparting a lateral movement to the tool holder during its axial movement and comprising two cooperating cam members, one carried by the bed and the other carried by said second slide.

15. In a machine tool, a head provided with a rotating spindle adapted to be provided with a work holder, a slide having a tool holder adapted to be provided with cutting tools, a pilot bushing adjacent the end of the spindle and a non-rotating support therefor.

16. In a machine tool, a head having a rotating spindle adapted to be provided with a work holder, a slide having a tool holder adapted to be provided with cutting tools, a pilot bushing adjacent the end of the spindle, a non-rotating support therefor, and a back facing tool carried by the bushing support.

17. In a machine of the character described, a head having a rotating spindle for supporting a work holder, a tool holder adapted to be provided with cutting tools, and a pilot support for the tool holder located adjacent the end of the spindle and diagonally disposed with reference to the axis thereof.

18. In a machine of the character described, a head having a rotating spindle for supporting a work holder, a tool holder adapted to be provided with cutting tools, and a pilot support for the tool holder located adjacent the end of the spindle and disposed off center and diagonally with respect to the axis of the spindle.

19. In a machine of the character described, a head having a rotating spindle for supporting a work holder, a tool holder adapted to be provided with cutting tools, a pilot bushing for the tool holder located adjacent the end of the spindle and diagonally disposed with reference to the axis thereof, and a non-rotating support for the bushing.

20. In a machine of the character described, a head having a rotating spindle for supporting a work holder, a tool holder adapted to be provided with cutting tools, a pilot bushing for the tool holder located adjacent the end of the spindle and diagonally disposed with reference to the axis thereof, a support for the bushing, and a back facing tool carried by the said support.

21. In a machine tool, a bed having a head with a rotating work holder and with a pilot support, a tool holder having a pilot portion and means for imparting to the tool holder first an axial movement and then a combined axial and lateral movement.

22. In a machine tool, a bed having a head provided with a rotating work holder, and with a pilot support, an axially movable slide on the bed and a tool holder, supported by the slide, and having a pilot portion engageable with said pilot support, and means whereby after the tool holder is moved axially toward the work holder by axial movement of said slide the tool holder is caused to be moved both axially and laterally and is at the same time caused to engage the pilot support.

23. In a machine of the character described, a rotating work holder, a tool holder disposed diagonally with respect to the axis of the machine, means forwardly of the tools for guiding the tool holder, and means for moving said tool holder bodily in directions longitudinally and laterally of the machine to impart to said tool holder a resultant movement in the direction of the axis of said machine.

In testimony whereof, I hereunto affix my signature,

FRED H. BOGART.